Figure 1:
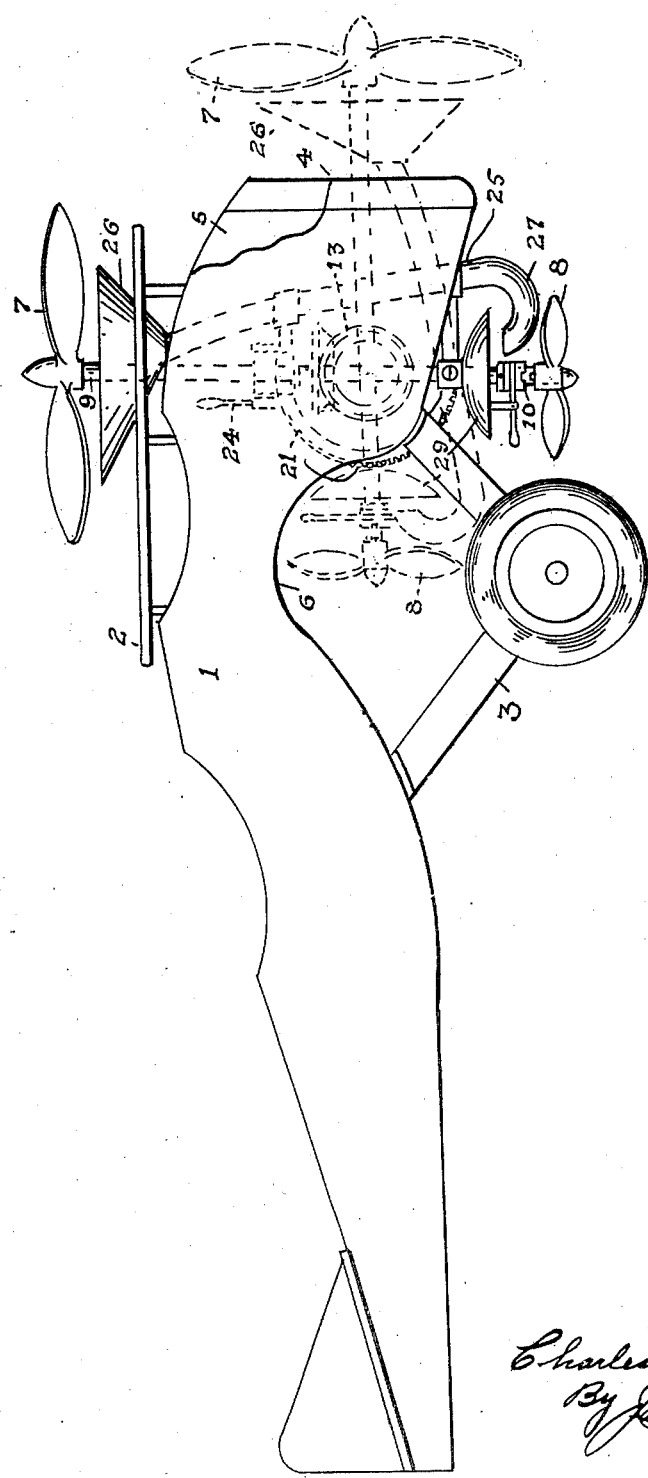

Nov. 11, 1930. C. P. DELO 1,781,371
AEROPLANE
Filed Sept. 10, 1928  2 Sheets-Sheet 2

INVENTOR
Charles P. Delo
By Jack Snyder
Attorney

Patented Nov. 11, 1930

1,781,371

UNITED STATES PATENT OFFICE

CHARLES P. DELO, OF KNOX, PENNSYLVANIA

AEROPLANE

Application filed September 10, 1928. Serial No. 304,857.

My invention relates to certain new and useful improvements in aeroplanes, and important objects of the invention are to provide an aeroplane of the character described which can ascend and descend perpendicularly, which can sustain itself motionless in the air; which embodies a pair of propellers that are simultaneously adjustable to desired angles to best meet conditions for ascending, descending, complete suspension, or normal flight; which embodies novel means for utilizing air currents generated by the operation of the main propeller for aiding in the ascent and flight of the aeroplane, or for retarding the descent of the latter. Under such conditions, providing an aeroplane that can take off and land safely within the limits of a relatively small area; obviating the necessity of flying fields of immense area as now required; and successfully rendering aviation adaptable for commercial purposes on an economic basis.

Further objects of the invention are to provide an aeroplane of the type disclosed which is simple in its construction and arrangement, strong, durable and highly efficient in its use, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawings wherein like numerals of reference designate corresponding parts throughout the several views:—

Figure 1 is a side elevational view of an aeroplane constructed in accordance with the invention.

Figure 2:
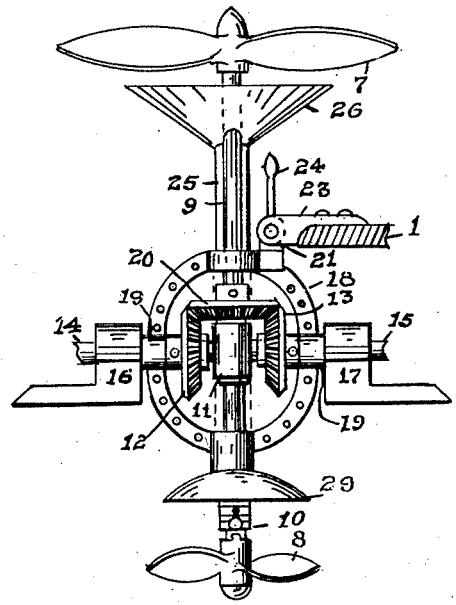

Figure 2 is a front detail view of the propeller mechanism with the propellers disposed in the horizontal position.

Figure 3:
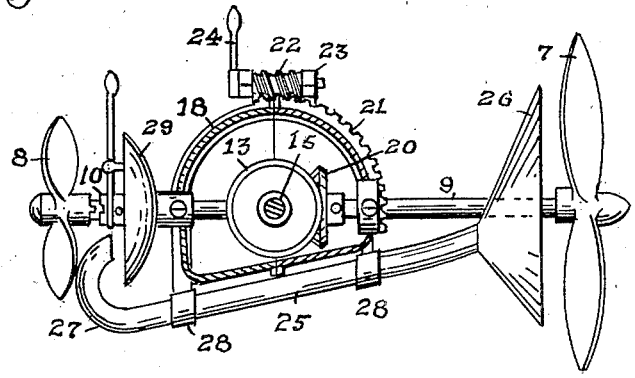

Figure 3 is a side detail view thereof with the propellers disposed in the vertical position.

Referring in detail to the drawings, Figure 1 illustrates an aircraft structure of the monoplane type comprising the fuselage 1, plane 2, and landing gear 3. The aircraft structure substantially conforms to the conventional configuration of analogous devices of the usual construction, with the exception that the nose 4, of the fuselage 1, is bifurcated or divided by a vertically extending recess 5, and that the bottom side of the fuselage 1 is formed with an under-cutting recess 6, to provide clearances for the purposes hereinafter fully described.

The present invention embodies a main propeller 7 and an auxiliary propeller 8. The main propeller 7 is fixed to the forward end of the drive shaft 9, and the auxiliary propeller 8 is rotatably mounted on the rearward end of the latter. The drive shaft 9 carries a clutch mechanism 10 operable for engaging or disengaging the auxlary propeller 8 to respectively effect or suspend the operation of the latter.

The drive shaft 9 extends through the fuselage 1 and may be shifted to extend perpendicularly, disposing the main propeller 7 approximately horizontal above the top of the air craft structure, and the auxiliary propeller 8 approximately horizontal below the bottom side of the latter, as clearly shown in Figure 1.

Further, the drive shaft 9 may be shifted to dispose the main propeller 7 approximately perpendicular at the forward end of the aircraft structure, and the auxiliary propeller 8 in the under-cut recess 6, as shown in dash lines in Figure 1. The provision of the fuselage nose recess 5 provides ample clearance for the adjustment of the drive shaft 9 together with associated parts, from the horizontal to the perpendicular positions, or to any other angular positions therebetween.

The drive shaft 9 is suitably journaled for rotation in a bearing 11, which in turn is pivotally mounted in the hubs of the opposed driving gears 12 and 13. The latter are fixed on the adjacent ends of the respective longitudinally aligned engine shafts 14 and 15. The engine shafts 14 and 15 are suitably journaled in respective bearings 16 and 17, and carry the housing frame 18, which is pivotally mounted thereon, as indicated at 19. A bevel gear 20 is fixed on the drive shaft 9 and meshes with the driving gears 12 and 13. The housing frame 18 properly encloses this transmission gearing and provides a chamber for holding lubrication necessary in its operation.

The housing frame 18 carries a fixed quadrant segment gear 21, which is engaged by a worm 22. The latter is suitably journaled in bearings 23, which are properly fixed to the fuselage 1 in any suitable manner. The worm 22 is operated by a ratchet lever 24, and provides for the adjustment of the propeller mechanism, and for maintaining the latter in its adjusted position.

An air conductor 25, having an inlet funnel 26, at its forward end, and a goose neck outlet 27, at its rearward end, is fixedly connected to and supported by the housing frame 18, as indicated at 28. The inlet funnel 26 is disposed adjacent to the main propeller 7, rearwardly of the latter.

A bell-shaped member 29 is fixed to the rearward end of the housing frame 18, and is disposed directly forward of the goose neck conductor outlet 27 for the purpose to be described.

It will here be noted, that when the worm 22 is operated, by the aviator for the purpose of adjustment, the entire propeller mechanism comprising the main propeller 7, auxiliary propeller 8, drive shaft 9, housing frame 18 and all transmission gearing therein, together with the air conductor 25 and the bell-shaped member 29, will shift simultaneously to their respective positions necessitated in effecting the proper adjustment.

When it is desired to ascend perpendicularly or nearly so, the propeller mechanism is adjusted to dispose the main propeller 7 approximately horizontal above the top of the aircraft structure, while the auxiliary propeller 8 is disposed approximately horizontal below the bottom side of the latter. The operation of the two propellers 7 and 8 will lift the aeroplane vertically upward. Such lifting action of the propellers 7 and 8 is further increased by the utilization of the air currents, which are generated by the operation of the main propeller 7 and forcibly conveyed through the conductor 25 to impinge against the concaved side of the bell-shaped member 29. In descending perpendicularly, it is only necessary to decelerate the operation of the propeller mechanism sufficiently to effect the desired dropping speed and assure a normally safe landing impact.

If it is desired to sustain the aeroplane motionless in the air, the propeller mechanism is operated at an exact speed that will cause neither further ascent nor allow descent. Normally, during motionless suspension of the aeroplane, in the air, the propellers 7 and 8 are operated in their respective horizontal positions above and below the air craft structure. However, if the aeroplane encounters head winds or other untoward air currents, motionless suspension is more efficiently effected by adjusting respective propellers 7 and 8 to dispose same at an angle between their horizontal and perpendicular positions, to best meet conditions found in practice.

For forward flight, the propeller mechanism is adjusted to dispose the propellers 7 and 8 approximately perpendicular in the usual manner employed in aeronautics. The function of the air conductor 25 will, of course, likewise augment the efficiency of the device in the forward flight. The simultaneous operation of the propellers 7 and 8 is optional with the aviator. The operation of the auxiliary propeller 8 may be suspended in the event that conditions in practice warrant same. However, the simultaneous operation of both propellers 7 and 8 is commended for all flying and suspension purposes.

Adjustment of the propeller mechanism, in the manner herein described, can be made and are made by the aviator, while the aeroplane is in the air. It is only necessary to operate the worm 22 to establish the adjustment of the propeller mechanism to effect the conditions and operations desired.

The use of my improved aeroplane will obviously eliminate the necessity of flying fields of immense areas, as now required in the take off and the landing of aeroplanes of the usual construction. The perpendicular ascent and descent permitted in the use of the present invention can be effected in the confines of relatively small areas, whereby aeronautics may be economically, commercially and advantageously exploited.

From the foregoing description, taken in connection with the accompanying drawings, the advantages of the construction and method of operation will be readily apparent to those skilled in the art to which the invention appertains, and while describing the principle of operation of the invention, together with a construction providing an embodiment thereof, it is to be understood that the device shown is merely illustrative, and that various changes in the form, arrangement and details of construction may be resorted to, without departing from the principle or sacrificing any of the advantages of the invention, as defined in the appended claims.

What I claim is:

1. In an aeroplane of the character described, the combination with an aircraft structure of suitable form, of a propeller operatively mounted in said aircraft structure, said propeller being adjustable to dispose same approximately perpendicularly at the forward end of said aircraft structure or approximately horizontally above the top of the latter or at any angle between said perpendicular and horizontal positions, and means adjustable with said propeller for conveying and directing air currents generated by the operation of the latter to impinge against said aircraft structure at a point remote from said propeller.

2. In an aeroplane of the character described, the combination with an aircraft structure of suitable form, a drive shaft operatively mounted in said aircraft structure, a main propeller carried at the forward end of said drive shaft, an auxiliary propeller carried at the rearward end of said drive shaft, said drive shaft being adjustable to dispose said main and auxiliary propellers at any angle from the perpendicular to the horizontal positions, and means shiftable with said drive shaft for conveying and directing air currents generated from the operation of said main propeller to impinge same against said aircraft structure at a point remote from said main propeller.

3. In an aeroplane of the character described, the combination with an aircraft structure of suitable form, a drive shaft operatively mounted in said aircraft structure, a main propeller carried at the forward end of said drive shaft, an auxiliary propeller carried at the rearward end of said drive shaft, said drive shaft being adjustable to dispose said main and auxiliary propellers at any angle from the perpendicular to the horizontal positions, a bell-shaped member carried adjacent to the rearward end of said drive shaft, and means for conveying and directing air currents generated by the operation of said main propeller to impinge same against said bell-shaped member.

4. In an aeroplane of the character described, the combination with an aircraft structure of suitable form, a drive shaft operatively mounted in said aircraft structure, a main propeller carried at the forward end of said drive shaft, an auxiliary propeller carried at the rearward end of said drive shaft, said drive shaft being adjustable to dispose said main and auxiliary propellers at any angle from the perpendicular to the horizontal positions, a bell-shaped member carried adjacent to the rearward end of said drive shaft, means for conveying and directing air currents generated by the operation of said main propeller to impinge same against said bell-shaped member, and means for independently suspending the operation of said auxiliary propeller.

In testimony whereof I affix my signature.

CHARLES P. DELO.